United States Patent
Ogino et al.

(10) Patent No.: US 8,748,039 B2
(45) Date of Patent: Jun. 10, 2014

(54) ENERGY STORAGE DEVICE AND MANUFACTURING METHOD THEREOF

(75) Inventors: Kiyofumi Ogino, Kanagawa (JP); Kazutaka Kuriki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 563 days.

(21) Appl. No.: 13/050,980

(22) Filed: Mar. 18, 2011

(65) Prior Publication Data

US 2011/0236755 A1    Sep. 29, 2011

(30) Foreign Application Priority Data

Mar. 26, 2010  (JP) ................................ 2010-072799

(51) Int. Cl.
*H01M 4/66* (2006.01)

(52) U.S. Cl.
USPC ....... 429/218.1; 429/233; 429/245; 29/623.1; 29/623.5; 29/25.03; 361/502; 361/504

(58) Field of Classification Search
CPC ......... H01M 4/64; H01M 4/66; H01M 4/666; H01M 4/667
USPC ...................... 429/417–522, 218.1, 223, 245; 29/623.1, 623.5, 25.03; 361/502, 504
See application file for complete search history.

(56) References Cited

U.S. PATENT DOCUMENTS

| | | | |
|---|---|---|---|
| 7,476,572 B2 | 1/2009 | Morisue et al. | |
| 7,759,735 B2 | 7/2010 | Maekawa | |
| 2010/0209784 A1 | 8/2010 | Yamazaki et al. | |
| 2010/0227228 A1 | 9/2010 | Yamazaki et al. | |

FOREIGN PATENT DOCUMENTS

| | | |
|---|---|---|
| JP | 2009-134917 | 6/2009 |
| JP | 2009134917 A * | 6/2009 |

OTHER PUBLICATIONS

Machine translation of JP-2009-134917, on Jan. 10, 2014, by Google Translate.*

* cited by examiner

*Primary Examiner* — Milton I Cano
*Assistant Examiner* — Ling R Zeng
(74) *Attorney, Agent, or Firm* — Nixon Peabody LLP; Jeffrey L. Costellia

(57) ABSTRACT

An electrode of an energy storage device with less deterioration by charge and discharge can be manufactured. In addition, an energy storage device which has large capacity and high endurance can be manufactured. A manufacturing method of an electrode of an energy storage device is provided in which a high-wettability regions and a low-wettability region are formed at a surface of a current collector, a composition containing silicon, germanium, or tin is discharged to the high-wettability regions and then baked to form separate active materials over a surface of the current collector. Thus, an electrode of an energy storage device with less deterioration due to charge and discharge can be manufactured.

8 Claims, 8 Drawing Sheets

ENERGY STORAGE DEVICE AND MANUFACTURING METHOD THEREOF

BACKGROUND OF THE INVENTION

1. Field of the Invention

The present invention relates to a method for manufacturing an electrode of an energy storage device. Further, the present invention relates to a method for manufacturing an energy storage device.

Note that the energy storage device indicates all elements which have a function of storing energy and all devices having the element.

2. Description of the Related Art

In recent years, the development of energy storage devices such as a lithium-ion secondary battery and a lithium-ion capacitor has been conducted.

The electrode of an energy storage device is formed by forming an active material over a surface of a current collector. As the active material, a material which can adsorb and desorb ions functioning as carriers, such as carbon or silicon, is used. For example, silicon has higher theoretical capacity than carbon and is advantageous in increasing the capacity of the energy storage device. However, silicon generates stress due to volume expansion when charged, which will cause the active material to be peeled off from the current collector; accordingly, the characteristics of the energy storage device may be deteriorated by charge and discharge cycles. Thus, some techniques for mitigating the effect caused by the volume expansion of the active material have been proposed (for example, Patent Document 1).

REFERENCE

[Patent Document 1] Japanese Published Patent Application No. 2009-134917

SUMMARY OF THE INVENTION

An object of one embodiment of the present invention is to manufacture an electrode of an energy storage device with less deterioration due to charge and discharge. Further, another object of one embodiment of the present invention is to manufacture an energy storage device which has large capacity and high endurance.

One embodiment of the present invention is a manufacturing method of an electrode of an energy storage device, in which high-wettability regions and a low-wettability region are formed at a surface of a current collector, a composition containing silicon, germanium, or tin is discharged to the high-wettability regions and then baked to form separate active materials on the surface of the current collector.

Another embodiment of the present invention is a manufacturing method of an electrode of an energy storage device, in which a photocatalytic layer is formed on a surface of a current collector, a low-wettability region is formed in part of the photocatalytic layer, high-wettability regions are formed by irradiating the photocatalytic layer with light to activate part of the photocatalytic layer other than the low-wettability region, and a composition containing silicon, germanium, or tin is discharged to the high-wettability regions and then baked to form separate active materials over the surface of the current collector.

Note that the current collector may have a recessed portion and a projected portion and the active material may be formed on the projected portion. Alternatively, separate insulating members may be formed over the substrate and the current collector may be formed over the insulating members.

The above current collector is a negative electrode current collector and the above active material is a negative electrode active material.

Another embodiment of the present invention is a method for manufacturing an energy storage device including a positive electrode, a negative electrode, and an electrolyte, in which the negative electrode is formed according to any of the above embodiments of the present invention.

According to one embodiment of the present invention, an electrode of an energy storage device with less deterioration due to charge and discharge can be manufactured. Further, according to one embodiment of the present invention, an energy storage device which has large capacity and high endurance can be manufactured.

DETAILED DESCRIPTION OF THE INVENTION

Figure 1A:
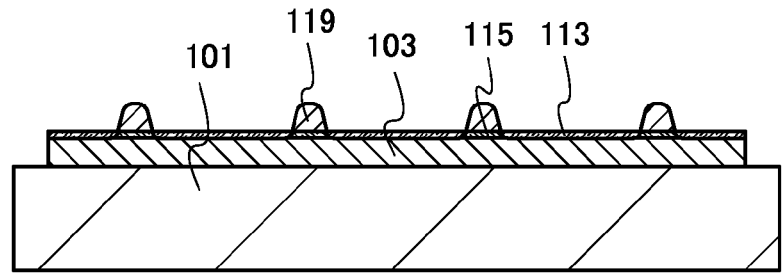
FIGS. 1A to 1D are cross-sectional views each illustrating one embodiment of a negative electrode of an energy storage device.

Hereinafter, embodiments of the present invention are described with reference to the drawings. Note that the present invention is not limited to the following description and it will be readily appreciated by those skilled in the art that modes and details can be modified in various ways without departing from the spirit and the scope of the present invention. Accordingly, the present invention should not be construed as being limited to the description of the embodiments to be given below. In description with reference to the drawings, in some cases, like reference numerals designate like portions in different drawings. Further, in some cases, the same hatching patterns are applied to similar parts, and the reference numerals thereof may be omitted.

Embodiment 1

In this embodiment, an electrode of an energy storage device which is one embodiment of the present invention and a manufacturing method thereof will be described.

A structure of an electrode of an energy storage device of this embodiment will be described with reference to FIGS. 1A and 1B.

FIG. 1A illustrates one embodiment of an electrode (a negative electrode) of an energy storage device. The electrode includes a current collector 103, a low-wettability region 113 at one surface of the current collector 103, high-wettability regions 115 surrounded by the low-wettability region 113, and active materials 119 on the high-wettability regions 115. Note that the current collector 103 is formed over the substrate 101. The low-wettability region 113 is formed on the periphery of the high-wettability regions 115. In other words, on the surface of the current collector 103, the high-wettability regions 115 are separated.

For the substrate 101, glass, quartz, ceramic such as alumina, or plastic can be used. A fiberglass-reinforced plastic (FRP) plate, a polyvinyl fluoride (PVF) film, a polyester film, an acrylic resin film can be given as examples of the plastic. Alternatively, a metal sheet including titanium, copper, nickel, tungsten, molybdenum, or the like can be used as the substrate 101 as appropriate.

The current collector 103 is formed using a conductive material which can be increased in wettability by surface treatment. A typical example of such a material is a conductive oxide material, including indium oxide including tungsten oxide, indium zinc oxide including tungsten oxide, indium oxide including titanium oxide, indium tin oxide including titanium oxide, indium tin oxide, indium zinc oxide, and indium tin oxide to which silicon oxide is added. The thickness of the current collector 103 is preferably 100 nm to 10 μm inclusive.

The low-wettability region 113 is a region in which the wettability is reduced by surface treatment on the current collector 103. The low-wettability region 113 has fluoro groups on the surface of the current collector 103. In the region having fluoro groups on the surface of the current collector 103, a fluid composition is rejected.

The high-wettability region 115 is a region in which the wettability is increased by surface treatment, typically oxygen plasma treatment, on the current collector 103. The high-wettability region 115 has hydroxyl groups on the surface of the current collector 103. In the region having hydroxyl groups on the surface of the current collector 103, a fluid composition spreads. Alternatively, the high-wettability region 115 is a region in which the wettability is increased by surface treatment on the current collector 103, typically a photochemical reaction of the surface of the conductive oxide material caused by irradiation with light or laser light having a wavelength capable of activating the current collector 103, which is selected as appropriate. Thus, a fluid composition spreads in the region.

Note that the wettability of the surface is affected by the chemical property of the surface. A region with a surface having low wettability with respect to a fluid composition is referred to as a low-wettability region. In contrast, a region with a surface having high wettability with respect to a fluid composition is referred to as a high-wettability region. In the high-wettability region, a contact angle with a fluid composition is small; therefore, the fluid composition spreads over the surface. In the low-wettability region, a contact angle with a fluid composition is large; therefore, the fluid composition is rejected.

As the active material 119, silicon, germanium, tin, or the like can be used as appropriate. Silicon and germanium can have an appropriate crystal structure, such as an amorphous structure, a polycrystalline structure, a single crystal structure, or a microcrystalline structure. By using silicon, germanium, tin, or the like as the active material 119, the capacity of the energy storage device can be significantly large. The height of the active material 119 is preferably 1 μm to 10 μm inclusive.

Figure 1B:
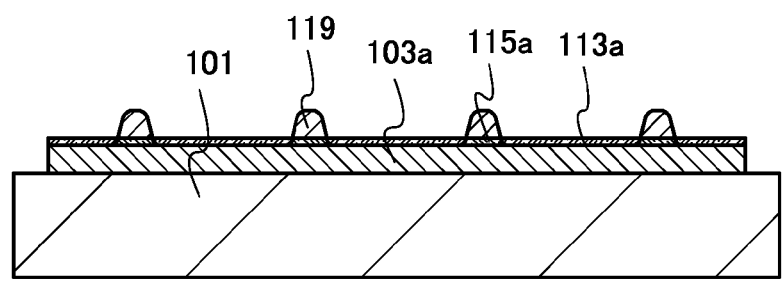

FIG. 1B illustrates one embodiment of an electrode (a negative electrode) of an energy storage device. The electrode includes a current collector 103a, a low-wettability region 113a at one surface of the current collector 103a, high-wettability regions 115a surrounded by the low-wettability region 113a, and the active materials 119 on the high-wettability regions 115a. The low-wettability region 113a is formed on the periphery of the high-wettability regions 115a. In other words, at the surface of the current collector 103a, the high-wettability regions 115a are separated.

The current collector 103a is formed using a conductive material which becomes a photocatalytic oxide semiconductor by oxidation treatment. Typical examples of such a material include titanium, zinc, zirconium, niobium, tungsten, tin, indium, and vanadium. The thickness of the current collector 103a is preferably 100 nm to 10 μm inclusive.

The current collector 103a may have a foil shape, a plate shape, or a net shape. With such a shape, the current collector 103a can hold its shape by itself, and the substrate 101 is therefore not essential as in FIG. 1D.

The low-wettability region 113a is a region formed of a metal oxide which is an oxidized current collector 103a and is also a region having fluoro groups on the surface. Examples of the metal oxide which is the oxidized current collector 103a include titanium oxide, zinc oxide, zirconium oxide, niobium oxide, zinc oxide, tungsten oxide, tin oxide, indium oxide, and vanadium oxide, which are oxide semiconductors. As a crystalline structure of titanium oxide, an anatase type, a rutile type, or a mixture of these types can be used.

The high-wettability region 115a is a region formed of a metal oxide which is an oxidized current collector 103a. The oxide semiconductor which is the oxidized current collector 103a is, for example, titanium oxide, zinc oxide, zirconium oxide, niobium oxide, zinc oxide, tungsten oxide, tin oxide, indium oxide, or vanadium oxide. They increase the wettability of their surfaces by light irradiation.

Figure 1C:
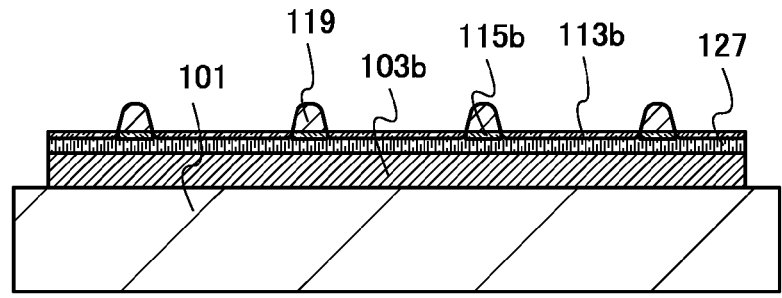
Figure 1D:
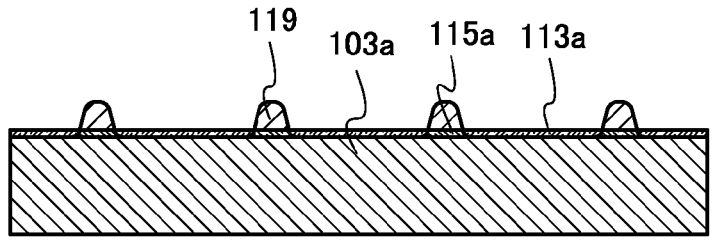

FIG. 1C illustrates one embodiment of an electrode (a negative electrode) of an energy storage device. The electrode includes a current collector 103b, a photocatalytic layer 127 on one surface of the current collector 103b, a low-wettability region 113b in a surface of the photocatalytic layer 127, high-wettability regions 115b surrounded by the low-wettability region 113b, and the active materials 119 on the high-wettability regions 115b. The low-wettability region 113b is formed on the periphery of the high-wettability regions 115b. In other words, at the surface of the photocatalytic layer 127, the high-wettability regions 115b are separated.

The current collector 103b is formed as appropriate using a conductive material which can be used as the current collector of the negative electrode. Examples of the conductive material which can be used as the current collector of the negative electrode include, but are not limited to, stainless steel, copper, and nickel. The thickness of the current collector 103b is preferably 100 nm to 10 μm inclusive.

The current collector 103b may have a foil shape, a plate shape, or a net shape. With such a shape, the current collector 103a can hold its shape by itself, and the substrate 101 is therefore not essential.

The photocatalytic layer 127 is formed of titanium oxide, zinc oxide, zirconium oxide, niobium oxide, zinc oxide, tungsten oxide, tin oxide, titanate such as strontium titanate, tantalate, niobate, cadmium sulfide, zinc sulfide (ZnS), cadmium selenide (CdSe), potassium tantalate, or the like.

As a crystalline structure of titanium oxide, an anatase type, a rutile type, or a mixture of these types can be used. Further, titanium oxide doped with a metal or nitrogen can be used as the photocatalytic layer. As the metal, there are platinum, copper, chrome, silver, vanadium, cobalt, zinc, rhodium, palladium, gold, and the like. When the photocatalytic layer is formed using titanium oxide doped with a metal or nitrogen, the photocatalytic layer 127 can be activated by not ultraviolet rays, but visible light, typically sunlight.

Since the photocatalytic layer 127 is an oxide semiconductor, the electrical conductivity of the negative electrode can be decreased by reducing the thickness of the photocatalytic layer 127. The thickness of the photocatalytic layer 127 is preferably 50 nm to 100 nm inclusive.

The low-wettability region 113b is a region in which the wettability is reduced by surface treatment on the photocatalytic layer 127. The low-wettability region 113b has fluoro groups at the surface of the photocatalytic layer 127.

The high-wettability region 115b is a region of the photocatalytic layer 127 which is irradiated with light and has high wettability.

As in FIGS. 1A to 1D, the low-wettability region and the high-wettability regions are formed over the current collector, and active materials are formed selectively on the high-wettability regions, whereby even when lithium ions are inserted into the active materials by charging to form an alloy with the active materials and the volume is expanded, the active materials are less likely to be in contact with one another; thus, peeling or wrinkles of the active materials can be suppressed. As a result, deterioration of the energy storage device caused by charge and discharge cycles can be reduced. Consequently, an energy storage device with high endurance can be manufactured.

Next, a manufacturing method of the electrode of the energy storage devices in FIGS. 1A to 1D will be described with reference to FIGS. 2A to 2E, FIGS. 3A to 3F, and FIGS. 4A to 4F.

First, a manufacturing method of the electrode of the energy storage device in FIG. 1A will be described with reference to FIGS. 2A to 2E.

Figure 2A:
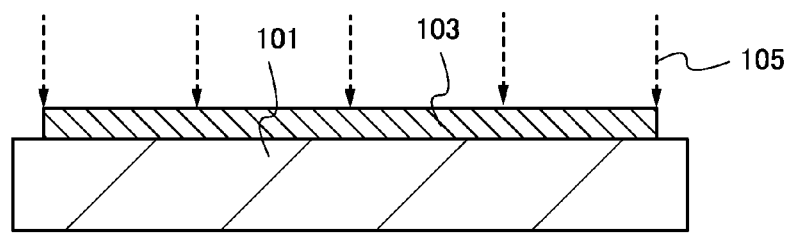
FIGS. 2A to 2E are cross-sectional views illustrating a manufacturing method of a negative electrode of an energy storage device.
Figure 2B:
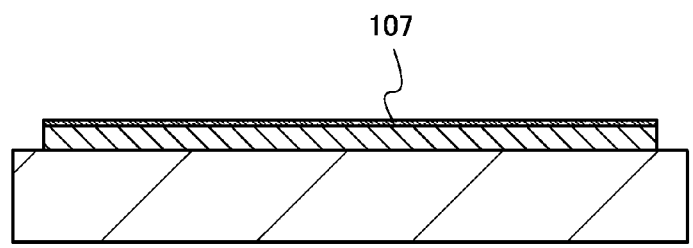

As illustrated in FIG. 2A, the current collector 103 is formed over the substrate 101. The current collector 103 can be formed by a sputtering method, an evaporation method, a printing method, an ink jetting method, a CVD method, and the like as appropriate.

Then, a surface of the current collector 103 is exposed to oxygen plasma 105. Thus, hydroxyl groups are bonded to the surface of the current collector, and a high-wettability region 107 can be formed at the surface of the current collector 103 as in FIG. 2B. Note that the high-wettability region 107 can also be formed by selecting, as appropriate, light or laser light having a wavelength capable of activating the current collector 103, and by irradiating the current collector 103 with the light or laser light instead of the oxygen plasma 105.

Figure 2C:
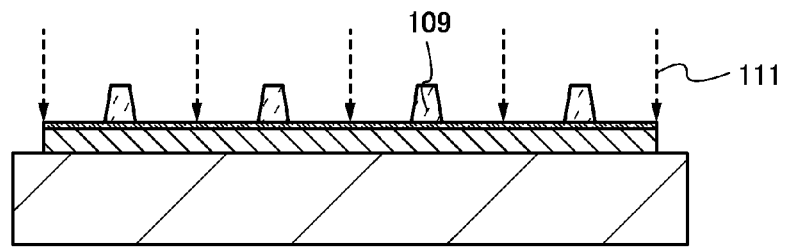
Figure 2D:
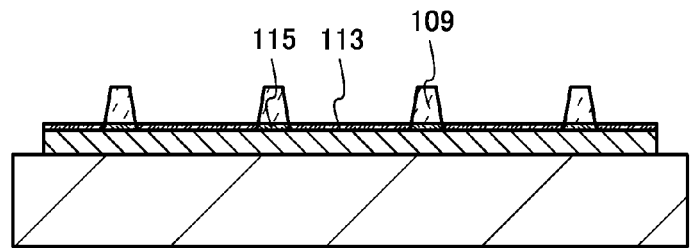

Then, as in FIG. 2C, a mask 109 is formed in a region in which the active material is to be formed later. The mask 109 can be formed by photolithography, an ink jetting method, a printing method, or the like, as appropriate.

Then, the surface of the current collector 103 is exposed to fluorine plasma 111. The high-wettability region 107 is at the surface of the current collector 103; a region of the high-wettability region 107 which is not covered with the mask 109 is exposed to the fluorine plasma 111 and fluoro groups are bonded to a surface of the region of the current collector 103. Thus, the region exposed to the fluorine plasma 111 becomes the low-wettability region 113 (see FIG. 2D).

Then, the mask 109 is removed to expose the high-wettability region 115.

Then, a composition containing silicon, germanium, or tin is discharged to the high-wettability regions 115. The composition containing silicon, germanium, or tin can be discharged by an ink jetting method. As typical examples of the composition containing silicon, germanium, or tin, a composition in which silicon particles, germanium particles, or tin particles are dispersed in a solvent, and a composition in which a high-order silane compound containing hydrogen and silicon or a high-order germane compound containing hydrogen and germanium is solved in an organic solvent can be given.

Figure 2E:
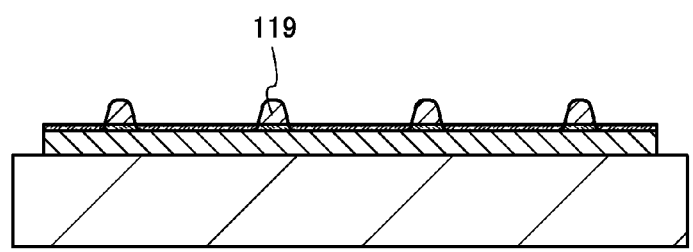

Then, the composition containing silicon, germanium, or tin is baked in order to evaporate the solvent in the composition containing silicon, germanium, or tin and also in order to melt silicon, germanium, or tin, whereby the active material 119 can be formed (see FIG. 2E).

Through the above steps, the electrode of the energy storage device in FIG. 1A can be manufactured.

Second, a manufacturing method of the electrode of the energy storage device in FIG. 1B will be described with reference to FIGS. 3A to 3F.

Figure 3A:
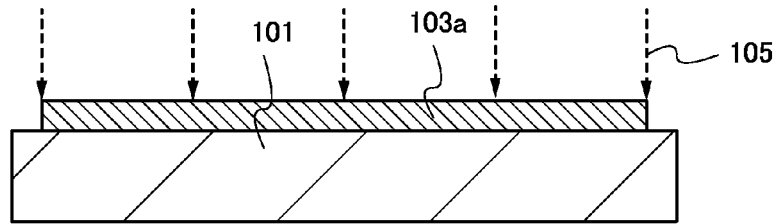
FIGS. 3A to 3F are cross-sectional views illustrating a manufacturing method of a negative electrode of an energy storage device.
Figure 3B:
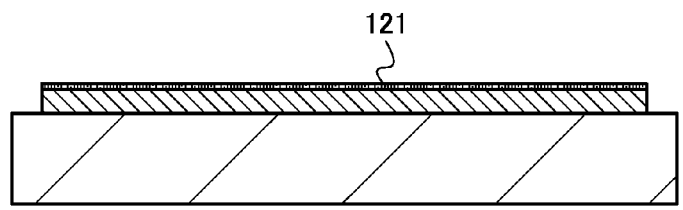

As illustrated in FIG. 3A, the current collector 103a is formed over the substrate 101. The current collector 103a can be formed as appropriate by a method similar to the manufacturing method of the current collector 103. The current collector 103a may have a foil shape, a plate shape, or a net shape.

Then, a surface of the current collector 103a is exposed to the oxygen plasma 105. The surface of the current collector is oxidized and a metal oxide layer is formed. The metal oxide layer is formed of an oxide semiconductor and serves as a photocatalytic layer 121 (see FIG. 3B).

Figure 3C:
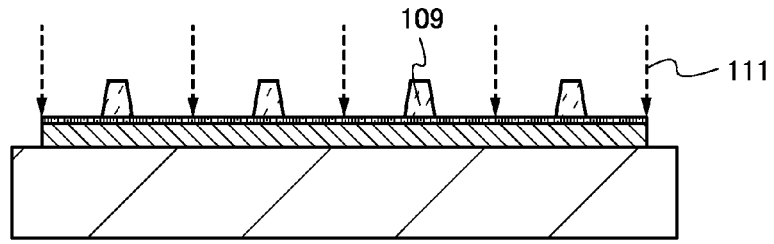
Figure 3D:
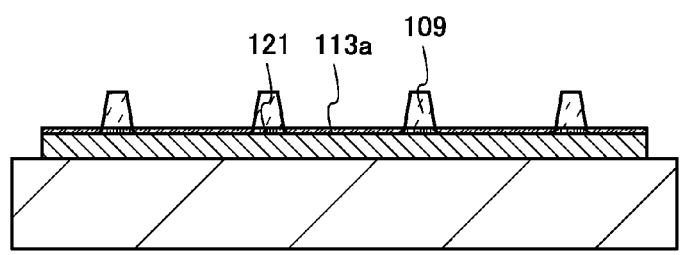

Then, as in FIG. 3C, the mask 109 is formed in a region in which the active material is to be formed later.

Then, the surface of the photocatalytic layer 121 is exposed to the fluorine plasma 111. A region of the photocatalytic layer 121 which is not covered with the mask 109 is exposed to the fluorine plasma 111, and fluoro groups are bonded to a surface of the region. Thus, the region exposed to the fluorine plasma 111 becomes the low-wettability region 113a (see FIG. 3D).

Figure 3E:
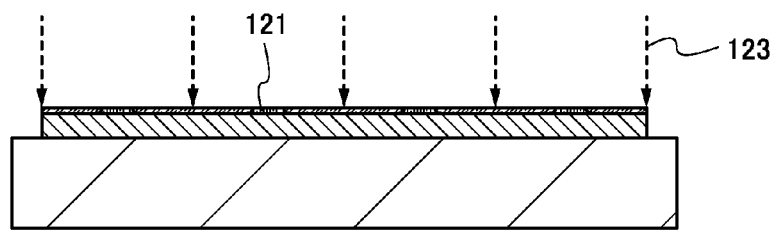

Then, the mask 109 is removed, and the photocatalytic layer 121 which has not been exposed to the fluorine plasma 111 is exposed as in FIG. 3E. Then, the photocatalytic layer 121 is irradiated with light 123 to form the high-wettability regions 115a. As the light 123, light having a wavelength capable of activating the photocatalytic layer 121 may be selected as appropriate. Alternatively, a laser beam having a wavelength capable of activating the photocatalytic layer 121 may be used. Typically, when the photocatalytic layer 121 is formed of titanium oxide, ultraviolet rays may be uses as the light 123. When the photocatalytic layer 121 is formed of CdS, visible light may be used as the light 123.

Figure 3F:
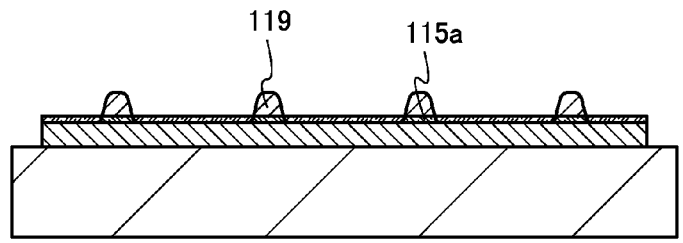

Then, a composition containing silicon, germanium, or tin is discharged to the high-wettability regions 115a as in FIG. 3F. Then, the composition containing silicon, germanium, or tin is baked, whereby the active material 119 can be formed.

Through the above steps, the electrode of the energy storage device in FIG. 1B can be manufactured.

Third, a manufacturing method of the electrode of the energy storage device in FIG. 1C will be described with reference to FIGS. 4A to 4F.

Figure 4A:
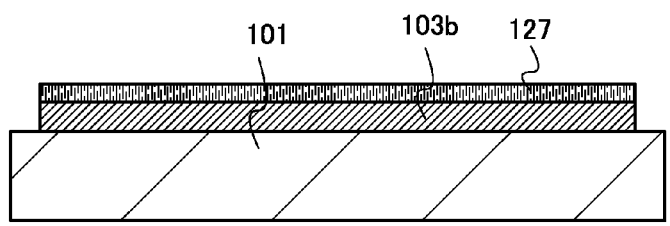
FIGS. 4A to 4F are cross-sectional views illustrating a manufacturing method of a negative electrode of an energy storage device.

As illustrated in FIG. 4A, the current collector 103b is formed over the substrate 101. The current collector 103b may have a foil shape, a plate shape, or a net shape.

Then, the photocatalytic layer 127 is formed on the current collector 103b. The photocatalytic layer 127 is formed by a sputtering method, a plasma CVD method, an evaporation method, a sol-gel method, a reverse micelle method, an electrophoresis method, a spray method, or the like as appropriate.

Figure 4B:
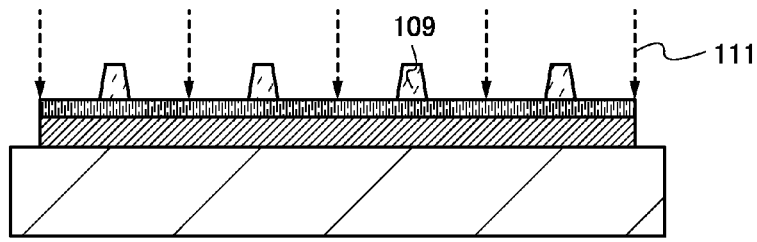
Figure 4C:
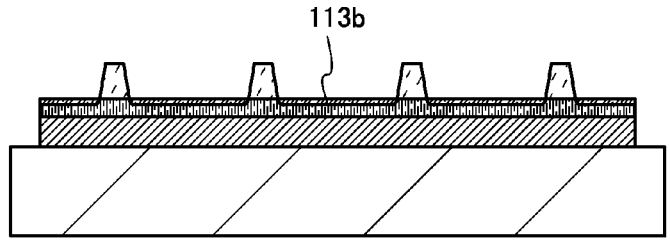

Then, as in FIG. 4B, the mask 109 is formed in a region in which the active material is to be formed later.

Then, the surface of the photocatalytic layer 127 is exposed to the fluorine plasma 111. A region of the photocatalytic layer 127 which is not covered with the mask 109 is exposed to the fluorine plasma 111, and fluoro groups are bonded to a surface of the region. Thus, the region exposed to the fluorine plasma 111 becomes the low-wettability region 113b (see FIG. 4C).

Figure 4D:
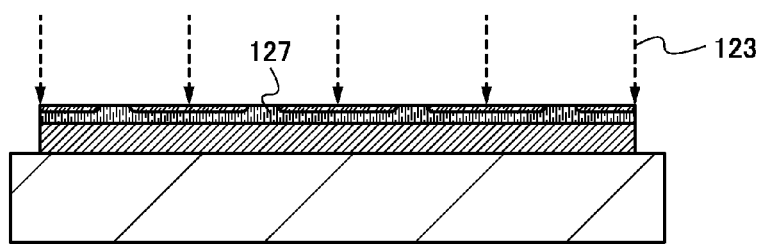
Figure 4E:
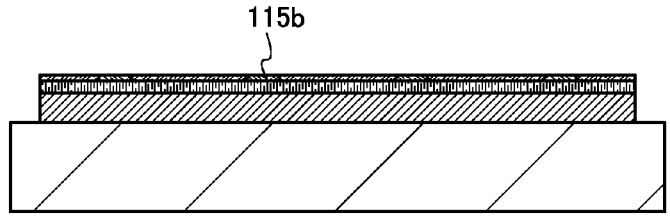
Figure 4F:
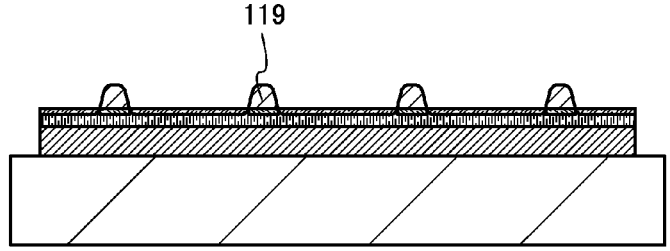

Then, the mask 109 is removed, and the photocatalytic layer 127 which has not been exposed to the fluorine plasma 111 is exposed as in FIG. 4D. Then, the photocatalytic layer 127 is irradiated with the light 123 to form the high-wettability region 115b (see FIG. 4E). Then, a composition containing silicon, germanium, or tin is discharged to the high-wettability region 115b. After that, the composition containing silicon, germanium, or tin is baked, whereby the active material 119 can be formed (see FIG. 4F).

Through the above steps, the electrode of the energy storage device in FIG. 1C can be manufactured.

In this embodiment, over the surface of the current collector, the high-wettability regions are selectively formed so as to be surrounded by the low-wettability region. Then, the composition containing silicon, germanium, or tin is discharged to the high-wettability regions and baked, whereby the separate active materials can be formed. Consequently, even when lithium and the active material are alloyed and the volume thereof is expanded due to charge of the energy storage device, the active materials are less likely to be in contact with one another; thus, peeling or wrinkles of the active materials can be suppressed. As a result, deterioration of the energy storage device caused by charge and discharge cycles can be reduced. Consequently, an energy storage device with high endurance can be manufactured.

Embodiment 2

In this embodiment, an electrode of an energy storage device and a manufacturing method thereof which are different from that described in Embodiment 1 will be described.

A structure of an electrode of an energy storage device of this embodiment will be described with reference to FIGS. 5A and 5B.

Figure 5A:
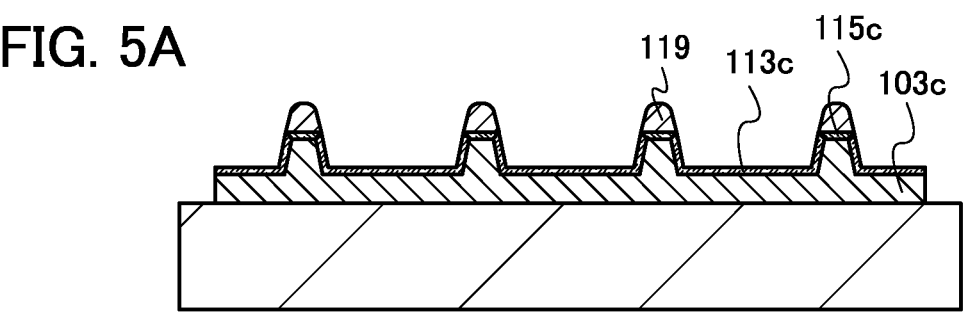
FIGS. 5A and 5B are cross-sectional views each illustrating one embodiment of a negative electrode of an energy storage device.

FIG. 5A illustrates one embodiment of an electrode (a negative electrode) of an energy storage device. The electrode includes a current collector 103c including projected portions, the low-wettability region 113c at a surface of the current collector 103c, the high-wettability regions 115c surrounded by the low-wettability region 113c, and the active materials 119 on the high-wettability regions 115c. The high-wettability regions 115c are formed at top surfaces of the projected portions of the current collector 103c. The low-wettability region 113c is formed on the periphery of the high-wettability regions 115c. In other words, at the surface of the current collector 103c, the high-wettability regions 115c are separated. Note that since the plane of the current collector 103c on which the active material 119 is not formed is a reference here, the region where the active material 119 is formed is referred to as the projected portion. When the plane on which the active material 119 is formed is a reference, the region where the active material 119 is not formed can be referred to as a recessed portion.

The current collector 103c can be formed using a material similar to the materials of the current collector 103 described in Embodiment 1. The low-wettability region 113c is a region in which the wettability is reduced by surface treatment on the current collector 103c. The low-wettability region 113c has fluoro groups at the surface of the current collector 103c. The high-wettability region 115c is a region in which the wettability is increased by surface treatment on the current collector 103c. The high-wettability region 115c has hydroxyl groups at the surface of the current collector 103c. Alternatively, the high-wettability region 115c is a region in which the wettability is increased by surface treatment on the current collector 103c, typically a photochemical reaction on the surface of the conductive oxide material caused by irradiation with light or laser light having a wavelength capable of activating the current collector 103c, which is selected as appropriate.

Figure 5B:
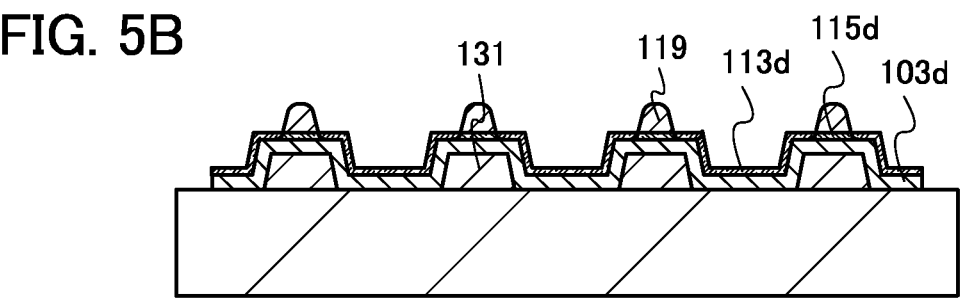

FIG. 5B illustrates one embodiment of an electrode (a negative electrode) of an energy storage device. The electrode includes separate insulating members 131, a current collector 103d over the substrate 101 and the insulating members 131, a low-wettability region 113d at a surface of the current collector 103d, separate high-wettability regions 115d formed in the low-wettability region 113d, and the active materials 119 on the high-wettability regions 115d. Note that the high-wettability regions 115d overlap with the insulating members 131.

The insulating member 131 can be formed of an oxygen compound, a nitrogen compound, or the like. Further, a stack of them can be used. Typical examples of the oxygen compound include silicon oxide and silicon oxynitride. Typical examples of the nitrogen compound include silicon nitride and silicon nitride oxide. Further, an organic resin such as polyimide, polyamide, benzocyclobutene (BCB), or acrylic can be used. Further, siloxane, polysilazane, or the like can be used. The thickness of the insulating member 131 is preferably 100 nm to 2 μm inclusive.

The current collector 103d can be formed using a material similar to the materials of the current collector 103 described in Embodiment 1. The thickness of the current collector 103d is preferably 100 nm to 5 μm inclusive. Here, since the insulating members 131 are provided, the current collector 103d can have recessed portions and projected portions, whereby the thickness of the current collector 103d can be reduced; thus, cost can be reduced.

The low-wettability region 113d is a region in which the wettability is reduced by surface treatment on the current collector 103d. The low-wettability region 113d has fluoro groups at the surface of the current collector 103d. The high-wettability region 115d is a region in which the wettability is increased by surface treatment on the current collector 103d. The high-wettability region 115d has hydroxyl groups at the surface of the current collector 103d. Alternatively, the high-wettability region 115d is a region in which the wettability is increased by surface treatment on the current collector 103d, typically a photochemical reaction on the surface of the conductive oxide material caused by irradiation with light or laser light having a wavelength capable of activating the current collector 103d, which is selected as appropriate.

Then, a manufacturing method of the electrode of the energy storage device in FIGS. 5A and 5B will be described with reference to FIGS. 6A to 6E and FIGS. 7A to 7E.

First, a manufacturing method of the electrode of the energy storage device in FIG. 5A will be described with reference to FIGS. 6A to 6E.

Figure 6A:
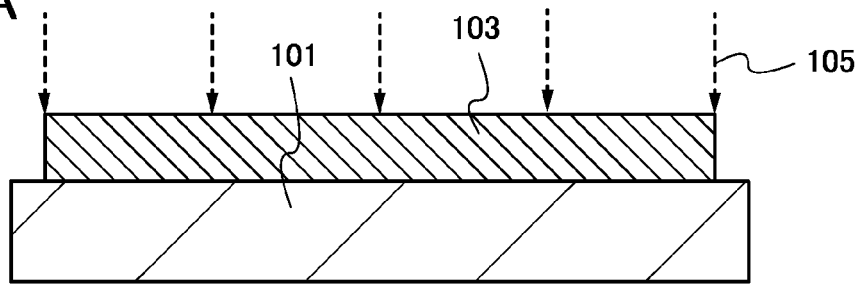
FIGS. 6A to 6E are cross-sectional views illustrating a manufacturing method of a negative electrode of an energy storage device.

As illustrated in FIG. 6A, the current collector 103 is formed over the substrate 101. Here, because the current collector 103 is partly etched in a later step, the thickness of the current collector 103 is preferably large, typically, 100 nm to 10 μm inclusive.

Figure 6B:
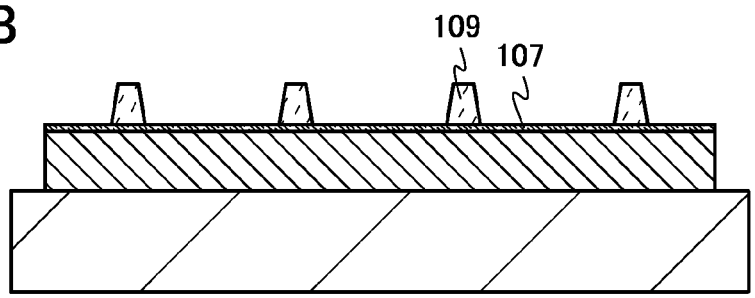

Then, a surface of the current collector 103 is exposed to the oxygen plasma 105 to form the high-wettability region 107 at the surface of the current collector 103 as in FIG. 6B.

Then, the mask 109 is formed in a region in which the active material is to be formed later.

Figure 6C:
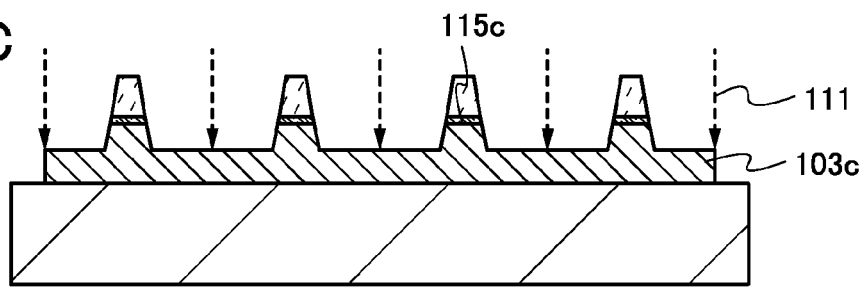
Figure 6D:
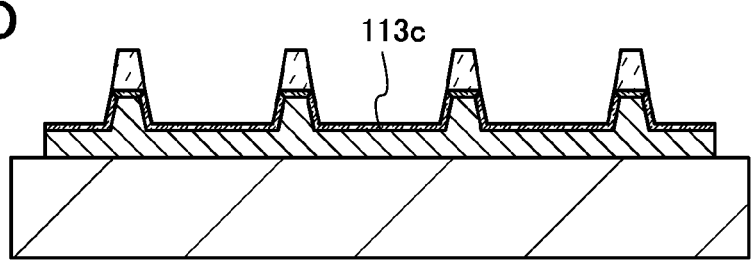
Figure 6E:
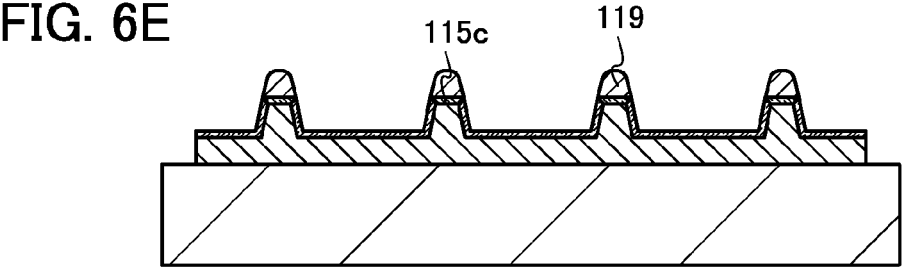

Then, the current collector 103 is partly etched using the mask 109 to form the current collector 103c having projected portions as in FIG. 6C. Here, the current collector 103 is etched in a manner such that the current collector 103c is not divided and the projected portions are separated. Here, the current collector 103 is etched by 50 nm to 500 nm inclusive from the surface, whereby the projected portions are formed. Thus, the high-wettability region 107 is also etched and the high-wettability regions 115c remain only at the top surfaces of the projected portions of the current collector 103c.

Then, the surface of the current collector 103c is exposed to the fluorine plasma 111. A region of the current collector 103c which is not covered with the mask 109 is exposed to the fluorine plasma 111, and fluoro groups are bonded to a surface of the region. Thus, the region exposed to the fluorine plasma 111 becomes the low-wettability region 113c (see FIG. 6D).

Then, the mask 109 is removed to expose the high-wettability regions 115c. Then, a composition containing silicon, germanium, or tin is discharged to the high-wettability regions 115c. The composition can be discharged by an ink jetting method. Then, the composition containing silicon, germanium, or tin is baked, whereby the active material 119 can be formed (see FIG. 6E).

Through the above steps, the electrode of the energy storage device in FIG. 5A can be manufactured.

Note that here, the electrode of the energy storage device is formed by the manufacturing method in Embodiment 1 illustrated in FIGS. 2A to 2E, but the manufacturing methods of the energy storage device illustrated in FIGS. 3A to 3F and FIGS. 4A to 4F can alternatively be employed as appropriate. In other words, the current collector 103a in FIGS. 3A to 3F may have projected portions as in FIG. 6C. Further, the current collector 103b in FIGS. 4A to 4F may have projected portions as in FIG. 6C.

Second, a manufacturing method of the electrode of the energy storage device in FIG. 5B will be described with reference to FIGS. 7A to 7E.

Figure 7A:
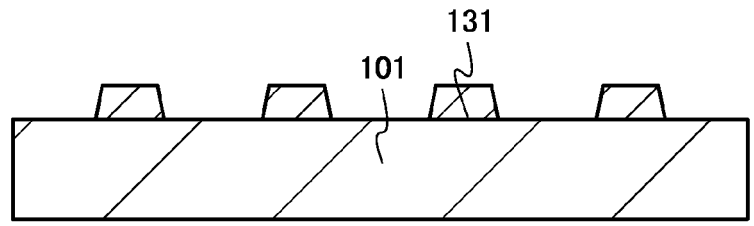
FIGS. 7A to 7E are cross-sectional views illustrating a manufacturing method of a negative electrode of an energy storage device.

As in FIG. 7A, the separate insulating members 131 are formed over the substrate 101. The insulating member can be formed by selectively disposing a composition containing an insulating material by an ink jetting method, a printing method, or the like as appropriate, and then baking the composition. Alternatively, the insulating members can be formed by forming an insulating layer over the substrate 101 by a sputtering method, a CVD method, a coating method, or the like and then partly etching the insulating layer using a mask formed by a photolithography process.

Then, the current collector 103d is formed over the substrate 101 and the insulating member 131. The current collector 103d can be formed like the current collector 103.

Figure 7B:
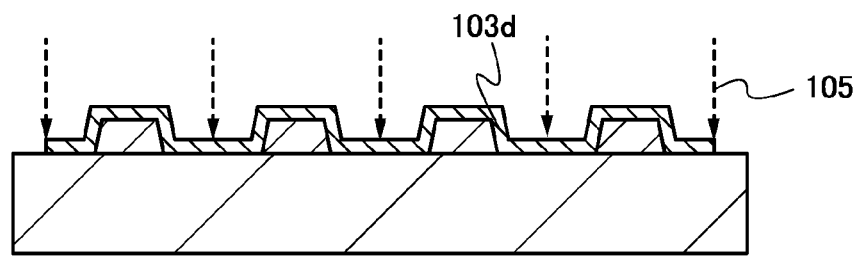

Then, as in FIG. 7B, a surface of the current collector 103d is exposed to the oxygen plasma 105. Thus, the high-wettability region 107 is formed at the surface of the current collector 103d.

Figure 7C:
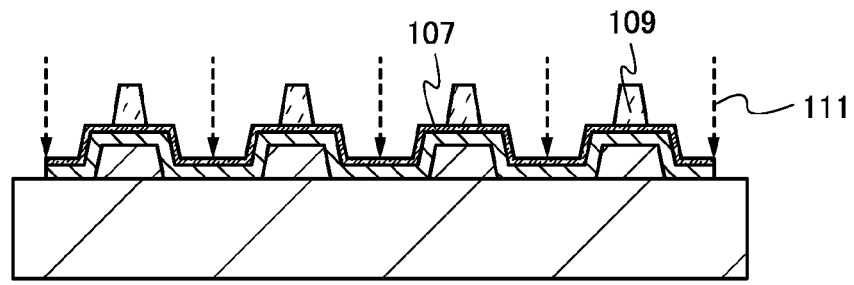

Then, as in FIG. 7C, the mask 109 is formed in a region in which the active material is to be formed later.

Then, the surface of the current collector 103d is exposed to the fluorine plasma 111. The high-wettability region 107 is at the surface of the current collector 103d; a region of the high-wettability region 107 which is not covered with the mask 109 is exposed to the fluorine plasma 111 and fluoro groups are bonded to a surface of the region of the current collector 103d. Thus, the region exposed to the fluorine plasma 111 becomes the low-wettability region 113d.

Figure 7D:
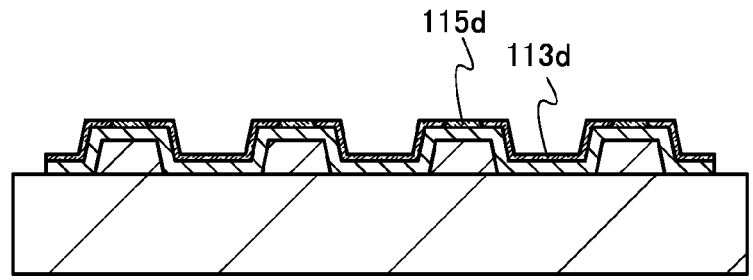
Figure 7E:
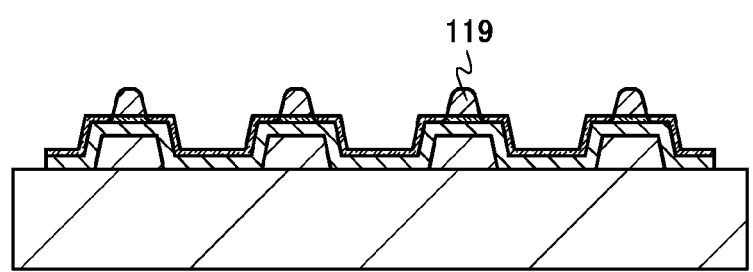

Then, the mask 109 is removed to expose the high-wettability regions 115d (see FIG. 7D). Then, a composition containing silicon, germanium, or tin is discharged to the high-wettability regions 115d. The composition can be discharged by an ink jetting method. Then, the composition containing silicon, germanium, or tin is baked, whereby the active material 119 can be formed (see FIG. 7E).

Through the above steps, the electrode of the energy storage device in FIG. 5B can be manufactured.

Note that here, the electrode of the energy storage device is formed by the manufacturing method in Embodiment 1 illustrated in FIGS. 2A to 2E, but the manufacturing methods of the energy storage device illustrated in FIGS. 3A to 3F and FIGS. 4A to 4F can alternatively be employed as appropriate. In other words, as in FIGS. 7A to 7E, the separate insulating members may be provided between the substrate 101 and the current collector 103a in FIG. 3A to 3F. Further, as in FIGS. 7A to 7E, the separate insulating members may be provided between the substrate 101 and the current collector 103b in FIGS. 4A to 4F.

Through the above steps, the electrode of the energy storage device in FIG. 5B can be manufactured.

In this embodiment, parts of the current collector are projected and the high-wettability regions are formed at the surfaces of the projected portions, and the low-wettability region is formed on the periphery of the high-wettability regions. Then, the composition containing silicon, germanium, or tin is discharged to the high-wettability regions and baked, whereby the separate active materials can be formed. In addition, since the active materials are formed on the surfaces of the projected portions of the current collector, the active materials are not in contact with one another even when lithium and the active materials are alloyed and the volume thereof is expanded due to charge of the energy storage device, and the active materials are less likely to be peeled off even when the active materials expand towards the current collector. As a result, deterioration of the energy storage device caused by charge and discharge cycles can be reduced. Consequently, an energy storage device with high endurance can be manufactured.

Embodiment 3

In this embodiment, a structure of an energy storage device will be described with reference to FIGS. 8A and 8B.

First, a structure of a secondary battery is described below as an energy storage device.

Among secondary batteries, a lithium ion battery formed using a lithium-containing metal oxide, such as $LiCoO_2$, has high capacity and high safety. Here, the structure of a lithium ion battery, which is a typical example of the secondary battery, is described.

Figure 8A:
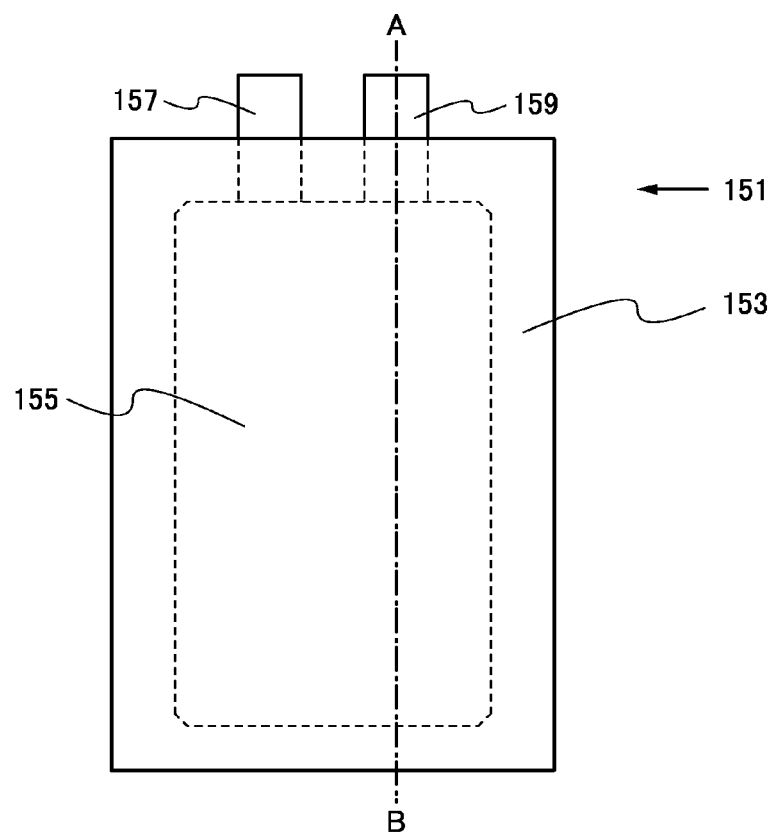
FIGS. 8A and 8B are a plan view and a cross-sectional view illustrating one embodiment of an energy storage device.
Figure 8B:
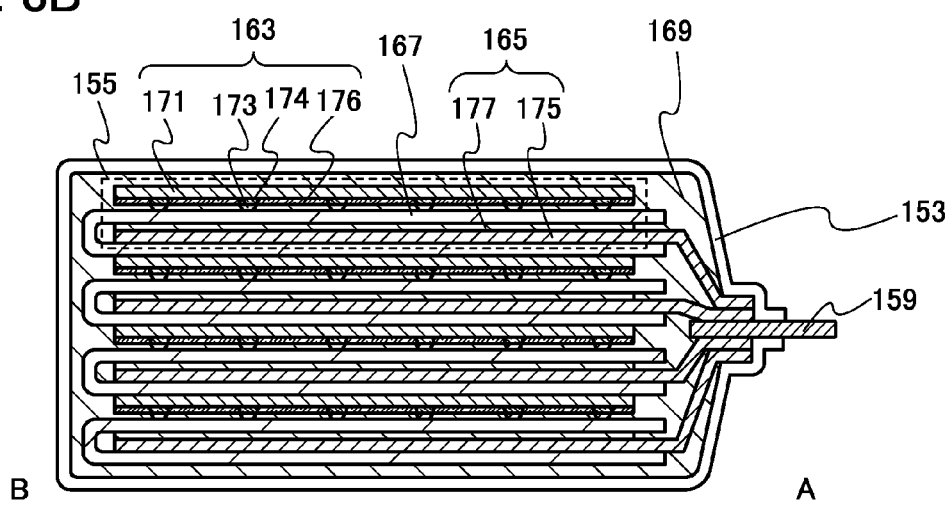

FIG. 8A is a plan view of an energy storage device 151, and FIG. 8B is a cross-sectional view taken along dot-dashed line A-B in FIG. 8A.

The energy storage device 151 illustrated in FIG. 8A includes an energy storage cell 155 in an exterior member 153. The energy storage device further includes terminal portions 157 and 159 which are connected to the energy storage cell 155. For the exterior member 153, a laminate film, a polymer film, a metal film, a metal case, a plastic case, or the like can be used.

As illustrated in FIG. 8B, the energy storage cell 155 includes a negative electrode 163, a positive electrode 165, a separator 167 between the negative electrode 163 and the positive electrode 165, and an electrolyte 169 filling the energy storage cell 155 and the separator 167 in the exterior member 153.

The negative electrode 163 includes a negative electrode current collector 171 and a negative electrode active material 173. A high-wettability region 174 is formed between the negative electrode current collector 171 and the negative electrode active material 173. Further, at the surface of the negative electrode current collector 171, a low-wettability region 176 is formed on the periphery of the high-wettability region 174.

The positive electrode 165 includes a positive electrode current collector 175 and a positive electrode active material 177.

The negative electrode active material 173 is formed on one surface of the negative electrode current collector 171. The positive electrode active material 177 is formed on one surface of the positive electrode current collector 175.

The negative electrode current collector 171 is connected to the terminal portion 157. The positive electrode current collector 175 is connected to the terminal portion 159. Further, part of the terminal portions 157 and 159 are led out from the exterior member 153.

Note that although a sealed thin energy storage device is described as the energy storage device 151 in this embodiment, a storage device can have a variety of structures; for example, a button storage device, a cylindrical storage device, or a rectangular storage device can be used. Further, although the structure where the positive electrode, the negative electrode, and the separator are stacked is described in this embodiment, a structure where the positive electrode, the negative electrode, and the separator are rolled may be employed.

As the negative electrode current collector 171, the current collector described in Embodiment 1 or Embodiment 2 can be used.

As the negative electrode active material 173, the active material described in Embodiment 1 or Embodiment 2 can be used.

Aluminum, stainless steel, or the like is used for the positive electrode current collector 175. The positive electrode current collector 175 may have a foil shape, a plate shape, or a net shape.

As the positive electrode active material 177, $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, or other materials can be used as appropriate.

As the solute of the electrolyte 169, a material which can transfer lithium ions and in which lithium ions stably exist is used. Typical examples of the solute of the electrolyte include lithium salt such as $LiClO_4$, $LiAsF_6$, $LiBF_4$, $LiPF_6$, and $Li(C_2F_5SO_2)_2N$.

As the solvent of the electrolyte 169, a material which can transfer lithium ions is used. As the solvent of the electrolyte 169, an aprotic organic solvent is preferable. Typical examples of an aprotic organic solvent include ethylene carbonate, propylene carbonate, dimethyl carbonate, diethyl carbonate, γ-butyrolactone, acetonitrile, dimethoxyethane, and tetrahydrofuran; one or more of these materials can be used. When a gelled polymer is used as the solvent of the electrolyte 169, safety against liquid leakage or the like is increased. In addition, the energy storage device 151 can be thin and lightweight. Typical examples of a gelled polymer include a silicon gel, an acrylic gel, an acrylonitrile gel, polyethylene oxide, polypropylene oxide, and a fluorine-based polymer.

As the electrolyte 169, a solid electrolyte such as $Li_3PO_4$ can be used.

As the separator 167, an insulating porous material can be used. Typical examples of the separator 167 include cellulose (paper), polyethylene, and polypropylene.

A lithium ion battery has a so-called small memory effect, high energy density, and high capacity. In addition, the driving voltage of a lithium ion battery is high. Thus, the size and weight of the lithium ion battery can be reduced. Further, the lithium ion battery does not easily deteriorate due to repetitive charge and discharge and can be used for a long time, and therefore enables cost reduction.

Second, a capacitor is described as an energy storage device. Typical examples of a capacitor include a double-layer capacitor and a lithium ion capacitor.

In the case of a capacitor, as the positive electrode active material 177 in the secondary battery in FIG. 8B, a material capable of reversibly adsorbing and desorbing lithium ions and/or anions is preferably used. Typical examples of the positive electrode active material 177 include active carbon, a conductive polymer, and a polyacene organic semiconductor (PAS).

The lithium ion capacitor has high efficiency of charge and discharge, capability of rapid charge and discharge, and a long life to withstand repeated use. The display panel needs high writing voltage and do not need power after writing of data; thus, it is preferable to use a lithium ion capacitor capable of rapid charge and discharge.

With the negative electrode described in Embodiment 1 or Embodiment 2, an energy storage device with high durability in which deterioration by charge and discharge cycles is suppressed can be manufactured.

This application is based on Japanese Patent Application serial no. 2010-072799 filed with Japan Patent Office on Mar. 26, 2010, the entire contents of which are hereby incorporated by reference.

What is claimed is:

1. An energy storage device comprising:
    a first insulating member and a second insulating member over a substrate;
    a current collector over the first insulating member and the second insulating member; and
    a first active material and a second active material over the current collector,
    wherein the first active material and the second active material overlap with the first insulating member and the second insulating member, respectively.

2. The energy storage device according to claim 1,
    wherein the first insulating member and the second insulating member are spaced from each other.

3. The energy storage device according to claim 1,
    wherein the current collector comprises a conductive oxide.

4. The energy storage device according to claim 1,
    wherein the current collector comprises a material selected from titanium, zinc, zirconium, niobium, tungsten, tin, indium, and vanadium.

5. The energy storage device according to claim 1,
    wherein the first active material and the second active material each comprise a material selected from silicon, germanium, and tin.

6. The energy storage device according to claim 1, wherein a first region of the current collector has more hydroxyl groups than a second region of the current collector, where the first region overlaps with the first insulating member and the second region is interposed between the first insulating member and the second insulating member.

7. The energy storage device according to claim 6, wherein the second region has more fluoro groups than the first region.

8. The energy storage device according to claim 1, wherein the first active material and the second active material are spaced from each other.

* * * * *